United States Patent
Takeuchi et al.

(10) Patent No.: US 8,089,857 B2
(45) Date of Patent: Jan. 3, 2012

(54) COMMUNICATION EQUIPMENT WHICH RECEIVES OFDM SIGNAL, OFDM-BASED WIRELESS COMMUNICATION SYSTEM AND METHOD FOR RECEIVING OFDM SIGNAL

(75) Inventors: Keisuke Takeuchi, Kunitachi (JP); Kenzaburo Fujishima, Kokubunji (JP); Rintaro Katayama, Kokubunji (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 12/368,602

(22) Filed: Feb. 10, 2009

(65) Prior Publication Data
US 2009/0245088 A1 Oct. 1, 2009

(30) Foreign Application Priority Data
Mar. 31, 2008 (JP) .................................. 2008-089130

(51) Int. Cl.
*H04J 11/00* (2006.01)
(52) U.S. Cl. .................... 370/210; 375/316; 708/404
(58) Field of Classification Search .......... 370/208–210; 375/260, 318; 708/403–410
See application file for complete search history.

(56) References Cited

U.S. PATENT DOCUMENTS

| | | | |
|---|---|---|---|
| 6,725,413 B1 | 4/2004 | Ishida | |
| 7,715,439 B2* | 5/2010 | Sood | 370/477 |
| 2002/0057750 A1* | 5/2002 | Nakao et al. | 375/345 |
| 2004/0052384 A1* | 3/2004 | Ashley et al. | 381/94.1 |
| 2006/0109925 A1* | 5/2006 | Kannan et al. | 375/260 |
| 2007/0076808 A1 | 4/2007 | Bhardwaj et al. | |
| 2008/0075212 A1* | 3/2008 | Chun et al. | 375/354 |
| 2008/0112496 A1* | 5/2008 | Devlin et al. | 375/260 |
| 2008/0181160 A1* | 7/2008 | Dillon | 370/312 |
| 2008/0298515 A1* | 12/2008 | Peyla et al. | 375/343 |
| 2009/0022238 A1* | 1/2009 | Kim | 375/260 |
| 2009/0088098 A1* | 4/2009 | Xu et al. | 455/127.2 |

FOREIGN PATENT DOCUMENTS

| | | |
|---|---|---|
| JP | 9-135137 | 5/1997 |
| JP | 2000-165343 | 6/2000 |
| JP | 2001-36548 | 2/2001 |

OTHER PUBLICATIONS

3GPP2. C.S0084-001-0V2.0.

* cited by examiner

*Primary Examiner* — Gary Mui
(74) *Attorney, Agent, or Firm* — Brundidge & Stanger, P.C.

(57) ABSTRACT

When a receiving apparatus which employs a OFDM-based cellular wireless communication scheme detects as an excessive signal for each frame, the signal having signal intensity exceeding a reference value after a Fourier transform, a gain variable according to an excessive quantity relative to the reference value is used for each frame to control signal intensity such that the amplitude thereof is at most the reference value.

17 Claims, 7 Drawing Sheets

PILOT SIGNAL

FREQUENCY

TIME

COMMUNICATION EQUIPMENT WHICH RECEIVES OFDM SIGNAL, OFDM-BASED WIRELESS COMMUNICATION SYSTEM AND METHOD FOR RECEIVING OFDM SIGNAL

CLAIM OF PRIORITY

The present application claims priority from Japanese patent application JP 2008-089130 filed on Mar. 31, 2008, the content of which is hereby incorporated by reference into this application.

BACKGROUND OF THE INVENTION

The present invention relates to a receiving apparatus to which a wireless communication scheme adopting an Orthogonal Frequency Division Multiplex (OFDM) is applied and to an OFDM-based wireless communication system.

To increase the transmission speed and the capacity of data for wireless communication, research and development are underway for the wireless communication scheme adopting OFDM. The OFDM is a scheme to transfer information by use of a plurality of subcarriers which are different in the frequency from each other and which are orthogonal to each other. A transmitting side generates data to be transferred in a frequency domain, converts the obtained signal through an inverse Fourier transform into a signal in a time domain, and transmits the signal as a wireless signal. The receiving side receives the signal and converts the signal in the time domain through a Fourier transform into a signal in the frequency domain to obtain the original information. To achieve the inverse Fourier transform and the Fourier transform, Inverse Fast Fourier Transform (IFFT) and Fast Fourier Transform (FFT) are employed in most cases. The OFDM receiving apparatus is configured, for example, as described in JP-A-2001-036548.

In the cellular wireless communication scheme using OFDM, for each of a plurality of mobile stations in a sector, i.e., a communicable range, a base station allocates a frequency resource in the units of a predetermined number of subcarriers for each period of time called a frame including a predetermined number of consecutive OFDM symbols to thereby conduct multiplexing for the mobile stations.

SUMMARY OF THE INVENTION

In general, not only receiving apparatuses which employ communication schemes using OFDM but also ones for the wireless communication include a circuit called Automatic Gain Controller (AGC) to keep predetermined magnitude of mean power of an input signal to a circuit which conducts signal demodulation. The AGC is configured, for example, as described in JP-A-09-135137.

By using the AGC, the mean power of OFDM signals inputted to the FFT calculator is almost fixed. The FFT has a property in which when the mean power of the input signals thereto is fixed, the mean power of output signals therefrom is in proportion to a reciprocal of the number of subcarriers exclusively used. The reason therefor is as follows.

Assume that a discrete data sequence having a length of N in a time domain is x(n) (n=0, 1, . . . , N−1) and a discrete data sequence having a length of N in a frequency domain obtained by conducting N-point discrete Fourier transform for x(n) is X(k) (k=0, 1, . . . , N−1). Then, a relationship represented by mathematical formula 1 called an equation of Perseval holds between x(n) and X(k).

[Mathematical formula 1]

$$\sum_{n=0}^{N-1} |x(n)|^2 = \frac{1}{N} \sum_{k=0}^{N-1} |X(k)|^2 \quad (1)$$

wherein, if X(k) is a discrete data sequence having a length of N generated by adding a sequence having a value of 0 to a discrete data sequence X'(k) (K=0, 1, . . . , N'−1) having a length N' (N'<N), mathematical formula 1 will be represented by mathematical formula 2.

[Mathematical formula 2]

$$\sum_{n=0}^{N-1} |x(n)|^2 = \frac{1}{N'} \sum_{k=0}^{N'-1} |X'(k)|^2 \quad (2)$$

Assuming that the mean power values of x(n) and X'(k) are respectively Et and Ef, mathematical formula 2 will be represented by mathematical formula 3. Mathematical formula 3 indicates that the mean power of the output signals from the FFT calculator is proportional to a reciprocal of the number of subcarriers exclusively used.

[Mathematical formula 3]

$$\overline{E}_f = \frac{N^2}{N'} \overline{E}_t \quad (3)$$

In the digital broadcasting of systems employing OFDM, subcarriers are fixedly allocated, and hence the number of subcarriers exclusively used will be fixed. In contrast thereto, in the cellular wireless communication, subcarriers are dynamically allocated to each mobile station in a sector. Hence, if only a small number of mobile stations exist in the sector, part of subcarriers may not be used.

If such unused subcarriers are present, the mean power of output signals from the FFT calculator increases due to the property of the FFT. In this situation, the amplitude of the signal also increases. Hence, a signal inputted to circuits subsequent to the FFT calculator may have amplitude exceeding the maximum value for the circuit. For such excessive input, processing or clipping is conducted to keep the signal not to exceed the maximum value by removing the excessive portion of the signal in many cases. However, the processing causes non-linear distortion in the resultant signal and may induce a decoding error.

To remove this problem, it is required to set the root mean square value (the value of the root of the mean power) of output signals from the FFT calculator when all subcarriers are exclusively used by securing a back-off relative to the maximum amplitude so that the value is at most the maximum value even if the instantaneous value of the amplitude of the signal greatly increases. However, if the back-off increases, the mean power of the signal decreases as much.

In contrast, in a next-generation mobile communication system, a multilevel modulation scheme such as a 16-level Quadrature Amplitude Modulation (16QAM) or a 64QAM is employed to increase the transmission speed. The number of the multilevel will also increase in future. In such a situation, to prevent the decoding error, a high Signal to Noise Ratio (SNR) is necessary for the input signal to be supplied to the demodulator unit. For a high SNR, it is required to increase the mean power on assumption that noise power is fixed.

As above, a trade-off relationship exists between the back-off to prevent the non-linear distortion due to increase in the power of the FFT output signal and the SNR to secure the demodulation characteristic of the multilevel-modulated received signal. Since the required value for the SNR is determined according to the modulation scheme and the required error rate, it is difficult to reduce a required value for the SNR. Hence, to meet the requirements of the back-off and the SNR, it is necessary that the increase in the amplitude of the FFT output is suppressed and the required quantity of the back-off is lowered.

For such requirement, US2007/0076808 and JP-A-2000-165343 describe configuration of the OFDM receiving apparatus having a function to suppress increase in the amplitude of a signal in a stage of the reception processing to cope with, for example, a variation in the received power due to fading. The configuration may also be employed to solve the above problem.

In these schemes, a circuit which provides a variable gain according to the amplitude of the received signal is arranged. If the amplitude exceeds a reference value, the circuit reduces the gain. However, if these schemes are applied to the cellular communication, a problem takes place as follows.

As described previously, in the cellular communication scheme using OFDM, a frequency resource is allocated for each frame so that each mobile station communicates with the base station. Hence, particularly, in the uplink communication, the mobile station which transmits a signal to the base station is switched for each frame. That is, the base station receives a signal from a propagation path which varies for each frame. In the processing to demodulate the signal, it is required to estimate the propagation path characteristic by use of pilot signals contained in the frame associated therewith.

In the configuration according to the scheme of US2007/0076808 or JP-A-2000-165343, the gain of the received signal is not changed for each frame. Hence, the gain of the received signal may vary at an intermediate point of the frame. If the gain changes at such point of the frame, the propagation path characteristic cannot be appropriately estimated. This possibly leads to a decoding error as a result. Description will be given in detail of this problem according to an example of demodulation of an uplink signal on Ultra Mobile Broadband (UMB) which is a standard of the cellular wireless communication scheme.

Figure 8A:
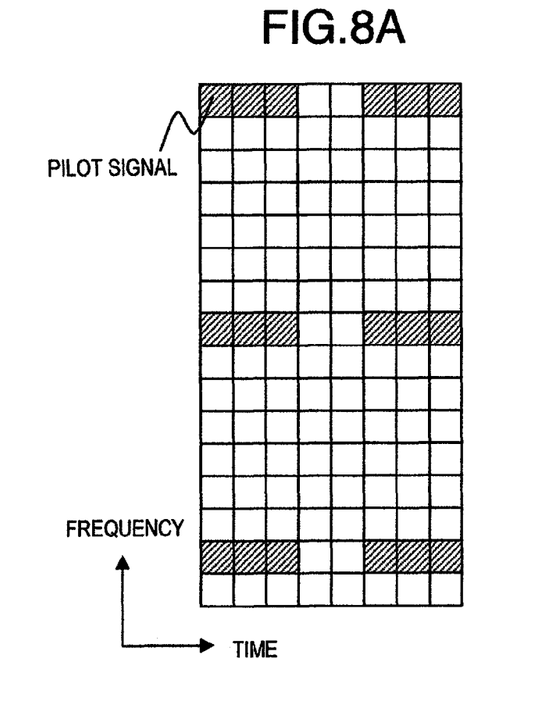
FIG. 8A is a schematic diagram showing allocation unit of UMB frequency and time resource and arrangement of pilot signals.
Figure 8B:
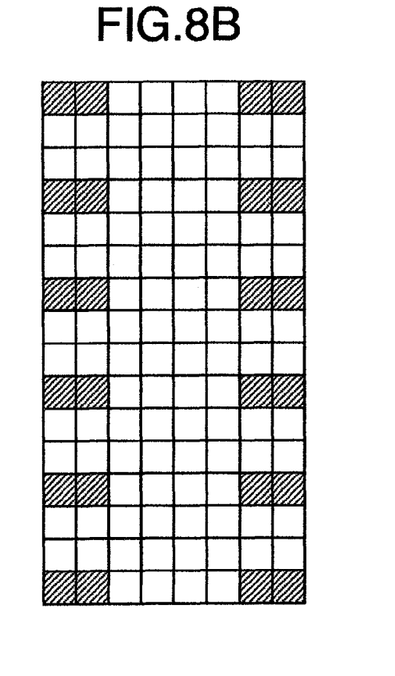
FIG. 8B is a schematic diagram showing allocation unit of UMB frequency and time resource and arrangement of pilot signals.

In the UMB uplink communication, the base station allocates, for each frame including eight OFDM symbols, 16 consecutive subcarriers to each mobile station. FIGS. 8A and 8B schematically show the allocation units of the frequency and time resources. In the region, pilot signals are assigned to first three OFDM symbols and last three OFDM symbols of every seventh subcarrier as shown in FIG. 8A or to first two OFDM symbols and last two OFDM symbols of every third subcarrier as shown in FIG. 8B.

The pilot signal has fixed transmission power and a phase which changes for each OFDM symbol. For the arrangement of FIG. 8A, three changing patterns in phase, i.e., phase rotation per each OFDM symbol of 0°, 120°, and −120° are used. For the arrangement of FIG. 8B, two changing patterns in phase, i.e., phase rotation per each OFDM symbol of 0° and 180° are used. The specification of the pilot signal is stipulated by 3GPP2 C.S0084-001-0 Ver. 2.0 3.1.3.4.1.1.

The UMB introduces a scheme in which transmitted signals from at most three mobile stations are multiplexed onto one and the same subcarrier of one and the same frame to increase the transmission capacity on the uplink communication line. For the base station to separate the multiplexed uplink signals according to the scheme, mutually different changing patterns in phase are assigned to the multiplexed mobile stations. Next, referring to the pilot arrangement of FIG. 8A, description will be given of the propagation path estimation for the uplink signal on which the transmitted signals from three mobile stations are multiplexed.

Assuming for the OFDM symbols ranging from the first symbol to the t-th (t=0, 1, 2) symbol of a frame that pilot signals transmitted from the mobile stations 0, 1 and 2 are respectively $p0(t)$, $p1(t)$, and $p2(t)$ and the propagation path characteristics from the mobile stations 0, 1 and 2 to the base station are respectively $h0(t)$, $h1(t)$, and $h2(t)$, then the pilot signal r(t) received by the base station is represented by mathematical formula 4 due to superimposition of the pilot signals from the three mobile stations. However, noise terms are omitted in mathematical formula 4.

[Mathematical Formula 4]

$$r(t)=h_0(t)p_0(t)+h_1(t)p_1(t)+h_2(t)p_2(t) \quad (4)$$

Assume that the propagation path characteristic is kept time-invariant for four OFDM symbols of the first-half section of the frame, and hk(t)=hk (hk is a constant; k=0, 1, 2). By using, as $p0(t)$, $p1(t)$, and $p2(t)$, the pilot signals for which the phase rotation is 0°, 120°, and −120° for each OFDM symbol, simultaneous equations represented by mathematical formula (5) including h0, h1, and h2 as variables are obtained using transmitted and received pilot signals of three OFDM symbols in the first-half section of the frame. However, amplitude of the signals is omitted in mathematical formula 5.

[Mathematical formula 5]

$$\begin{pmatrix} r(0) \\ r(1) \\ r(2) \end{pmatrix} = \begin{pmatrix} 1 & 1 & 1 \\ 1 & e^{j2\pi/3} & e^{-j2\pi/3} \\ 1 & e^{-j2\pi/3} & e^{j2\pi/3} \end{pmatrix} \begin{pmatrix} h_0 \\ h_1 \\ h_2 \end{pmatrix} \quad (5)$$

Since an inverse matrix exists for the 3-by-3 matrix on the right side of mathematical formula 5, the simultaneous equations can be solved to determine the propagation path characteristic of a range from each mobile station to the base station. This also applies to the last-half section of the frame. Also, the propagation path estimation can be similarly carried out by use of the pilot signal arrangement shown in FIG. 8B when the transmitted signals from two mobile stations are multiplexed.

However, if the gain varies at an intermediate point of the first-half section of the frame, it is not possible to assume that the propagation path characteristic is time-invariant in the first-half section. Hence, an appropriate propagation path characteristic is not obtainable by using the above technique. Therefore, the modulation processing is neither appropriately conducted. This may cause a decoding error. As a result, the advantage of reduction in the decoding error through prevention of the excessive input cannot be obtained.

An example of UMB has been described above. Also in other OFDM-based cellular wireless communication schemes, it can be considered that unless every OFDM symbol includes pilot signals, a certain type of approximation is carried out in the direction of the time axis by using a propagation path characteristic attained on the basis of pilot signals existing in the vicinity of each other on the time axis of one and the same frame. In this situation, if the gain varies in the frame, it is required that the gain is taken into consideration for each OFDM symbol in the demodulation processing. As a result, the processing is complicated. Hence, it is desirable that the gain is kept unchanged in the frame.

In conclusion, it is an object of the present invention to solve the problem inherent to the FFT used to receive OFDM signals by the receiving apparatus in the OFDM-based cellular wireless communication. Specifically, the object is to prevent, at occurrence of an increase in power due to unused subcarriers, an excessive input to a circuit subsequent to the FFT calculator and also to prevent the variation of the gain in the frame which possibly causes a decoding error.

To achieve the object as described above, the communication equipment of the present invention is for receiving an OFDM signal to which subcarriers to be used are allocated for each frame including OFDM symbols, comprising a reception circuit for receiving the OFDM signal, wherein the reception circuit comprises: a timing detector for detecting a boundary of a frame of a received signal; a first counter for outputting a control signal to switch to a frame after the detected boundary; a unit for calculating a gain in the frame after the boundary based on the control signal; a gain controller for reading a signal sequence contained in the frame after the boundary based on the control signal and reflecting the calculated gain in the signal sequence; and a decoder for decoding the signal sequence in which the gain is reflected.

In other words, the communication equipment according to the present invention is communication equipment for OFDM signals in which subcarrier allocation changes for each frame and includes a synchronizing means which detects a boundary of a frame in a signal outputted from a particular section to output a control signal indicating the boundary, a means detecting an excessive signal which operates according to the control signal to detect, for each frame period, an excessive signal whose signal intensity after the Fourier transform exceeds a reference value and which outputs an excessive quantity relative to the reference value at detection of the excessive signal; a means calculating a gain which operates according to the control signal to calculate a variable gain for each frame, and a means adjusting a gain which operates according to the control signal to reflect the variable gain for each frame in the received signal.

In the wireless communication system of the present invention, a transmitter communicates an OFDM signal with a receiver, wherein: subcarriers to be used are allocated to the OFDM signal, for each frame including a predetermined number of OFDM symbols; the receiver comprises a reception circuit comprising: a timing detector for detecting a boundary of a frame of a received signal; a first counter for outputting a control signal to switch to a frame after the detected boundary; a unit for calculating a gain in the frame after the boundary based on the control signal; a gain controller for reading a signal sequence contained in the frame after the boundary based on the control signal and reflecting the calculated gain thus in the signal sequence; and a decoder for decoding the signal sequence in which the gain is reflected.

In other words, the OFDM communication system according to the present invention includes a plurality of base stations and a plurality of mobile stations to communicate therebetween OFDM signals in which the subcarrier allocation changes for each frame, wherein the base station or the mobile station detects for each frame an excessive signal whose signal intensity after the Fourier transform exceeds a reference value; calculates, at detection of the excessive signal, a variable gain according to an excessive quantity relative to the reference value; and reflects in the received signal, the gain for the frame associated therewith.

In a method of receiving an OFDM signal of the present invention, subcarriers to be used are allocated to the OFDM signal, for each frame including a predetermined number of OFDM symbols, the method comprising the steps of: detecting as an excessive signal for each frame, the signal having signal intensity exceeding a reference value after a Fourier transform; calculating, at detection of the excessive signal, a gain variable according to an excessive quantity relative to the reference value; and using for a received signal, the gain for the frame associated therewith.

In other words, the OFDM receiving scheme according to the present invention is an OFDM signal receiving scheme of receiving OFDM signals in which subcarrier allocation changes for each frame and includes a step of detecting, for each frame, an excessive signal whose signal intensity after the Fourier transform exceeds a reference value, a step of outputting an excessive quantity relative to the reference value at detection of the excessive signal, a step of calculating a variable gain according to the excessive quantity, and a step of reflecting in the received signal, the gain for the frame associated therewith.

According to the present invention, an increase in amplitude of the FFT output signal is detected to adjust the gain according to the signal amplitude. Hence, even at occurrence of an excessive FFT output signal due to unused subcarriers, amplitude of the input signal to the stage subsequent to the FFT is at most the reference value to thereby prevent the non-linear distortion due to the excessive input. This reduces the required back-off, and the SNR is improved according to the back-off reduction.

By adjusting the gain in synchronization with the frame, it is possible to prevent the gain variation in the frame, which causes the decoding error in the cellular communication with the propagation path characteristic changing for each frame.

By identifying the frame number, the processing is appropriately executed also for a frame requiring exceptional processing.

As above, the decoding error is suppressed and hence the number of signal retransmissions is reduced, which resultantly increases the throughput.

Other objects, features and advantages of the invention will become apparent from the following description of the embodiments of the invention taken in conjunction with the accompanying drawings.

DETAILED DESCRIPTION OF THE EMBODIMENTS

First Embodiment

Figure 1:
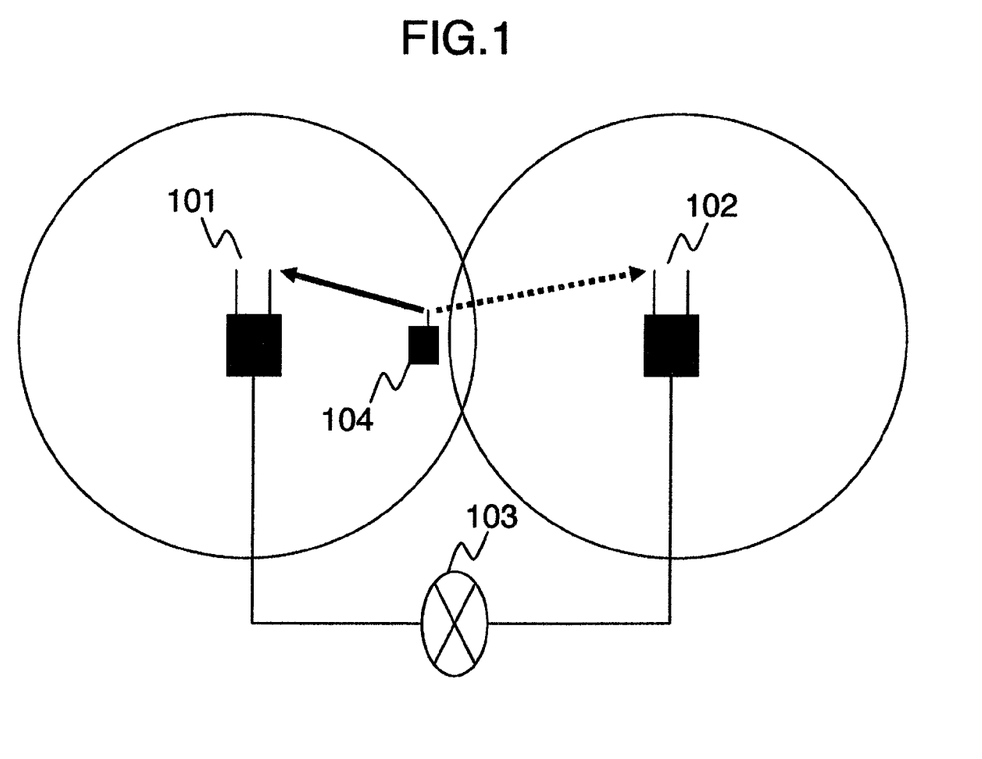
FIG. 1 is a schematic diagram showing configuration of a cellular wireless communication system.

Referring to FIGS. 1, 2A, 2B, 3, 4 and 5, description will be given of a first embodiment according to the present invention. In general, an OFDM-based cellular communication system includes a plurality of base stations and a plurality of mobile stations as shown in FIG. 1. Base stations 101 and 102 connect via wired communication lines to a network 103. A mobile station 104 connects via a wireless communication line to the base station 101 to communicate with the network 103.

Figure 2A:
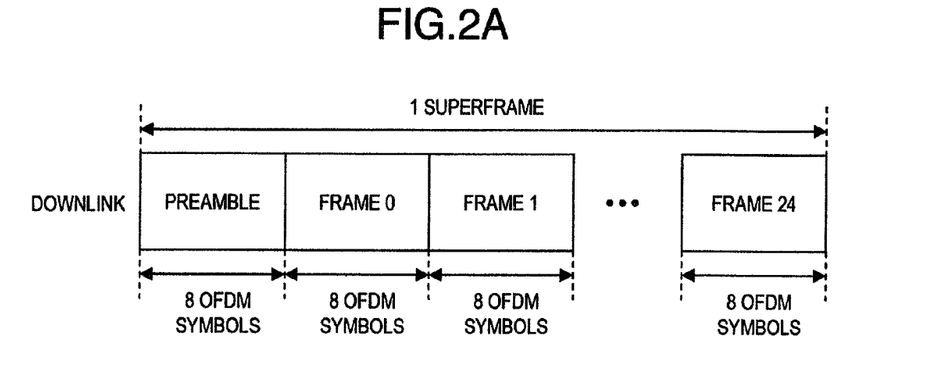
FIG. 2A is a diagram showing a layout of downlink frames for a UMB wireless section.
Figure 2B:
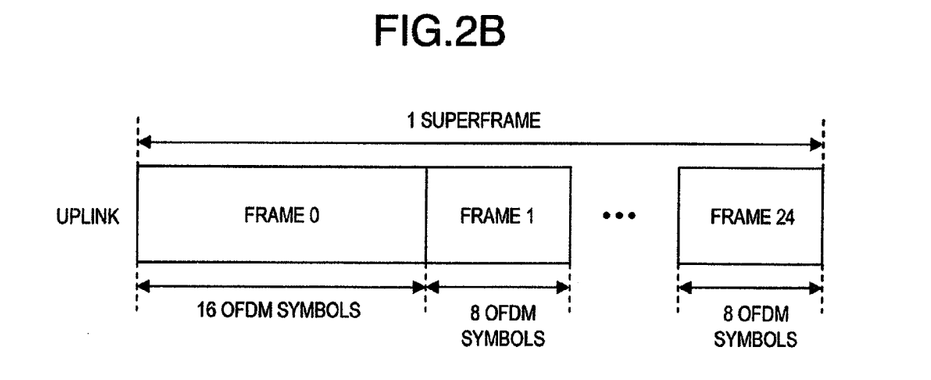
FIG. 2B is a diagram showing a layout of uplink frames for a UMB wireless section.

Assume in the following description that the wireless communication line conforms to the UMB specification. FIGS. 2A and 2B show frame layouts for radio signals in the UMB. According to the UMB, a period from transmitting a preamble to transmitting the next preamble is referred to as a superframe. A downlink superframe includes 25 frames following a preamble, the superframe being followed by the next preamble. The preamble and each frame have an equal length of eight OFDM symbols.

In contrast, no preamble is included in the uplink signals. The superframe includes 25 frames. Only the 0-th frame has a length of 16 OFDM symbols and each of the other frames has a length of 8 OFDM symbols. Therefore, in a system in which the downlink and uplink are synchronized with each other, the timing from the first to 24th frames of the uplink matches with that of the first to 24th frames of the downlink.

Figure 3:
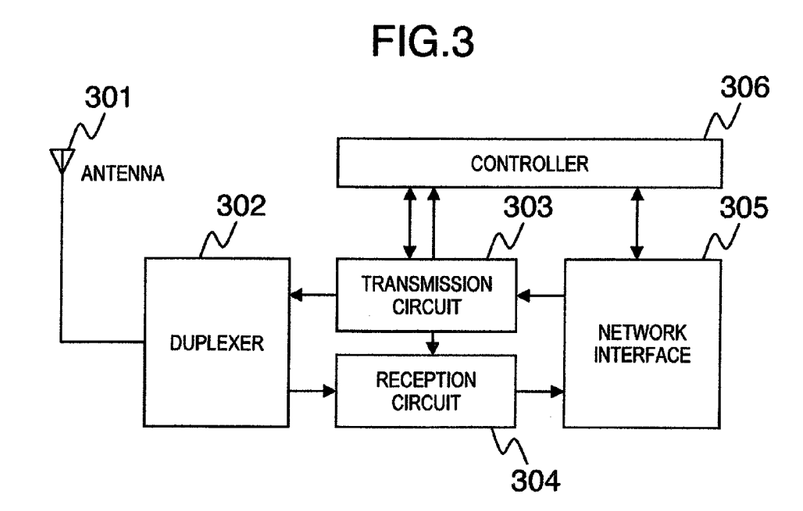
FIG. 3 is a block diagram showing an overall configuration of a base station.

FIG. 3 is a block diagram showing a configuration of the base stations 101 and 102. The base station includes an antenna 301, a duplexer 302, a transmission circuit 303, a reception circuit 304, a network interface 305, and a controller 306.

Figure 4:
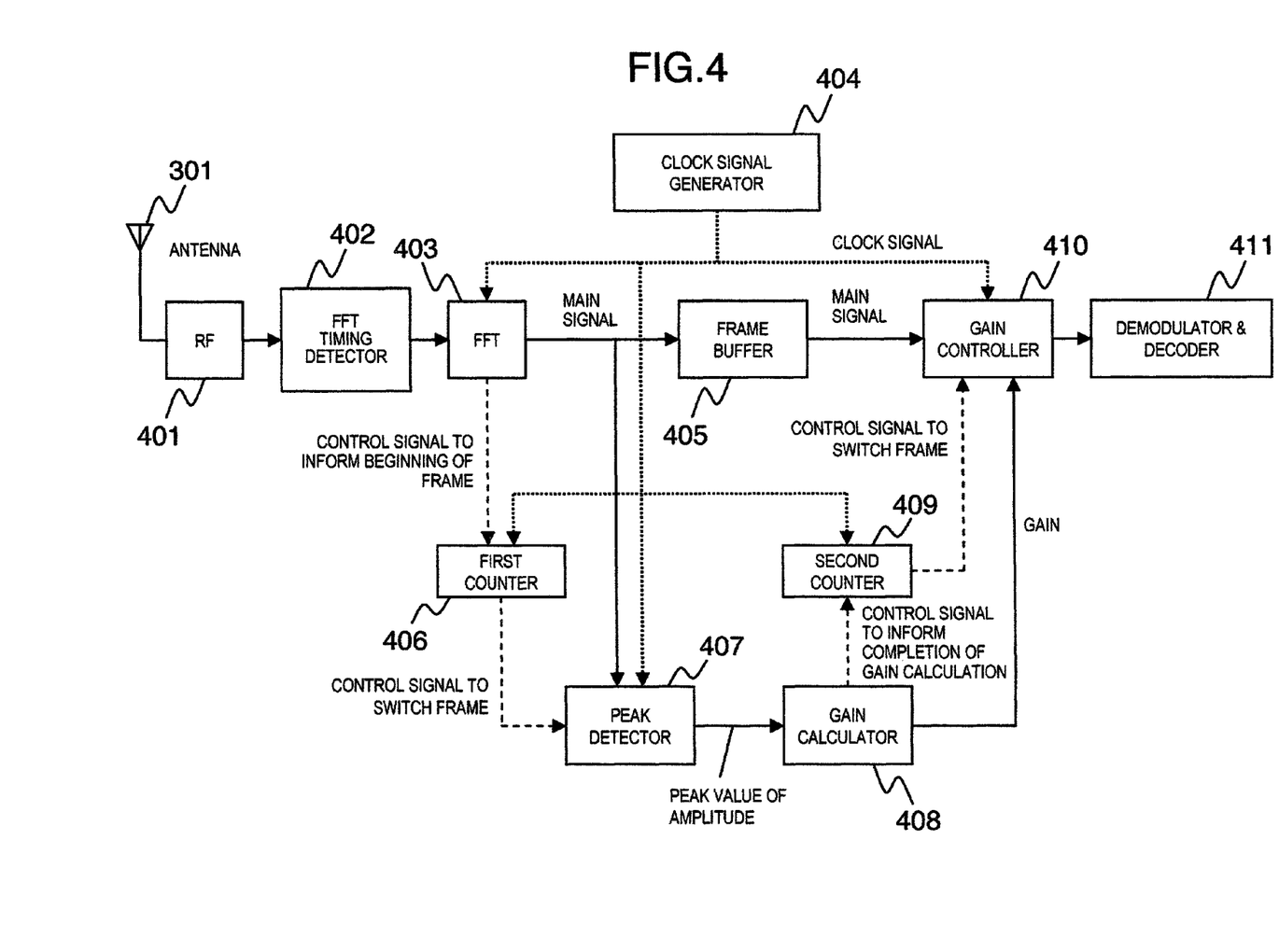
FIG. 4 is a block diagram showing a reception circuit of a base station in a first embodiment.

FIG. 4 is a block diagram showing a configuration of the reception circuit 304 adopted in both the base stations 101 and 102. The circuit 304 includes an antenna 301, a Radio Frequency (RF) circuit 401, an FFT timing detector 402, an FFT calculator 403, a clock signal generator 404, a frame buffer 405, a first counter 406, a peak detector 407, a gain calculator 408, a second counter 409, a gain controller 410, and a demodulator and decoder 411.

In the base stations 101 and 102, all the constituent components of the transmission circuit 303 and the reception circuit 304 operate in synchronization with the clock signal generated by the clock signal generator 404. However, for simplicity, FIG. 4 shows part of clock signal paths.

Referring to FIG. 4, the following description will be given in detail of a flow of a signal received by the base station 101. A signal received by the antenna 301 is inputted to the RF circuit 401 to be converted from a carrier-band signal into a baseband signal.

The RF circuit 401 includes an AGC. The AGC keeps mean power of signals outputted from the RF circuit 401 at a predetermined value.

The signal outputted from the RF circuit 401 is inputted to the FFT timing detector 402.

The FFT detector 402 detects the first data of a discrete data sequence inputted thereto for which the FFT calculation is conducted.

The FFT calculator 403 receives, as an input thereto, a predetermined number of data sequences beginning at the first data detected by the FFT timing detector 402, for which the FFT calculation are conducted, and conducts an FFT calculation for the input to output a result. Also, when outputting the first data of the frame, the FFT calculator 403 transmits a control signal to inform beginning of frame to the first counter 406.

When the first counter 406 receives the control signal to inform beginning of frame, it transmits a control signal to switch frame to the peak detector 407.

Figure 5:
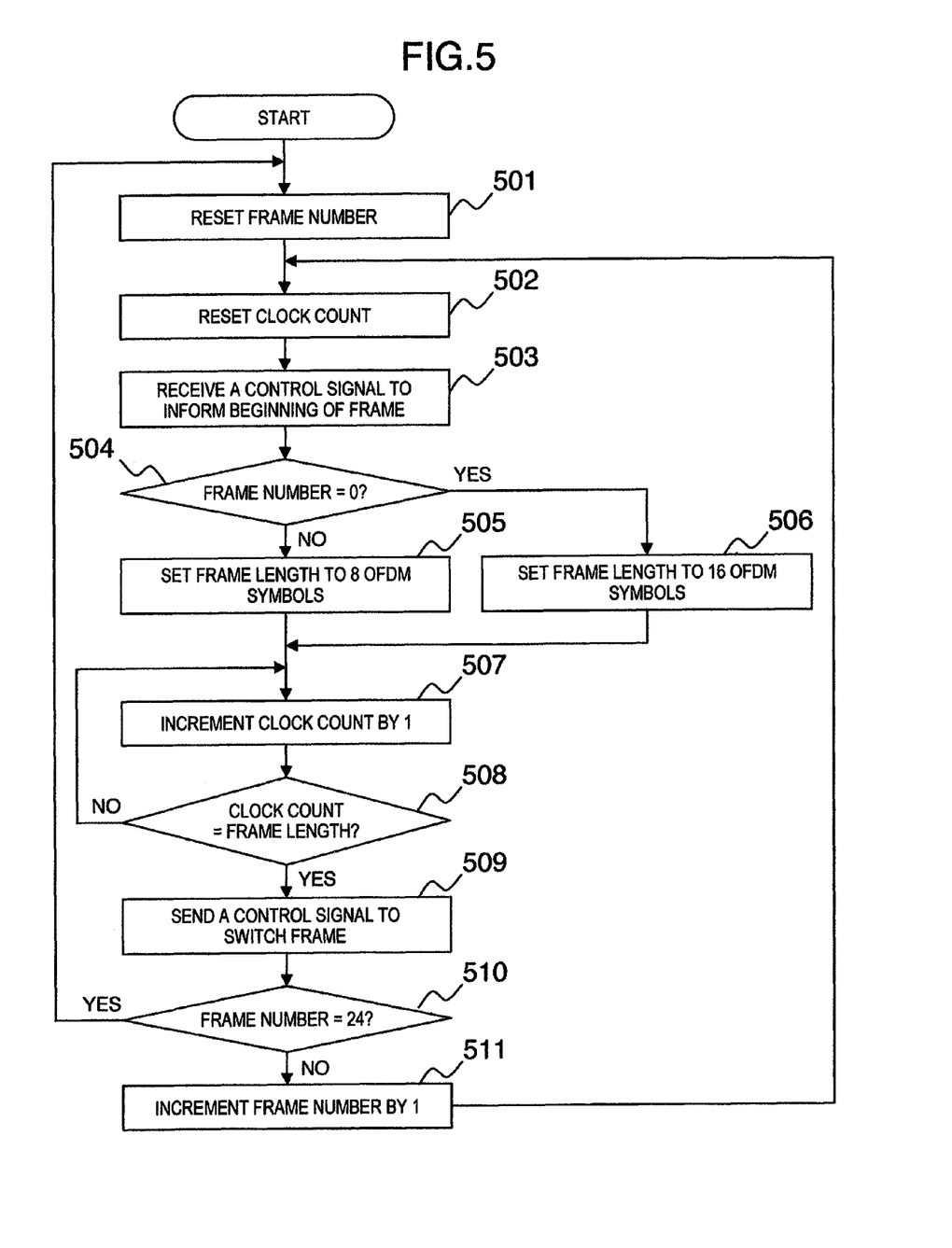
FIG. 5 is a flowchart showing operation of a counter.

The operation of the first counter 406 will now be described in detail by referring to the flowchart as shown in FIG. 5. The counter 406 first resets the frame number and the clock count to zero (steps 501 and 502). In this state, if a control signal to inform beginning of frame is received from another processing unit (step 503), the counter 406 judges whether or not the frame number is zero (step 504). If the frame number is other than zero, the counter 406 sets the length of one frame to eight (step 505). If the frame number is zero, the counter 406 sets the frame length to 16 (step 506).

When the counter 406 receives a clock signal after the frame length is completely set by either one of the above steps, it increments the clock count by one (step 507).

Next, the counter 406 judges whether or not the clock count is a value corresponding to the frame length thus set (step 508). Otherwise, step 507 follows.

If the clock count is the value corresponding to the frame length, the counter 406 assumes that the count is completed for one frame and then transmits a control signal to switch frame to a processing unit requiring the control signal (step 509).

When the control signal to switch frame is completely transmitted, the counter 406 judges whether or not the frame number is 24 (step 510). If the frame number is 24, step 501 follows. If the frame number is not 24, the frame number is incremented by one (step 511) and then step 502 follows.

The data sequence outputted from the FFT calculator 403 is stored in the frame buffer 405 and is inputted to the peak detector 407.

When the peak detector 407 receives the control signal to switch frame from the first counter 406, it refers to the value of each of the signal sequences outputted from the FFT calculator 403 for one frame beginning at the point of time, to set the maximum value as the peak value of amplitude of the FFT output signal in the frame associated therewith.

The gain calculator 408 divides, if the peak value obtained through the above procedure exceeds a reference value of input amplitude (a maximum value of input amplitude) of the demodulator and decoder 411, the reference value by the peak value to set the quotient of the division as a gain to be applied during the frame period. When the gain calculator 408 completes the gain calculation, it transmits a control signal to inform completion of gain calculation to the second counter 409.

When the second counter 409 receives the control signal to inform completion of gain calculation, it transmits a control signal to switch frame to the gain controller 410. The operation of the second counter 409 is similar to that of the first counter 406 shown in FIG. 4 excepting that the second counter 409 receives a control signal to inform completion of gain calculation in place of the control signal to inform beginning of frame in step 503.

When the gain controller 410 receives the control signal to switch frame from the second counter 409, it sequentially reads one frame of data from the frame buffer 405, multiplies the data by the gain provided from the gain calculator 408 to output the product of the multiplication. The data sequence outputted from the gain controller 410 is inputted to the demodulator and decoder 411.

Using the input data sequence, the demodulator and decoder 411 conducts processing such as estimating propagation path, demodulating and decoding the error correction code, to obtain the original information transmitted from the mobile station 104.

An advantage of the first embodiment of the present invention will be described using experimental results attained through simulation. In the simulation, the transmitting side encodes a packet of 128 bits per frame by using a turbo code having a coding rate of 1/5, modulates the encoded packet in the 64QAM, and transmits the modulated data using 110 modulation symbols. One packet is transmitted at most six times.

The receiving side sets the SNR to 10 decibel (dB) and the root mean square (RMS) value of the FFT output signal to a value 12 dB higher than the RMS value obtained when all subcarriers are used. The receiving side also sets the upper-limit value of the input signal amplitude to a stage subsequent to the FFT calculator to a value 6 dB higher than the RMS value obtained when all subcarriers are used. The receiving side conducts a clipping processing for any signal whose amplitude exceeds the upper-limit value and then demodulates and decodes the signal.

As a result of the communication processing of 100 frames under the condition described above, the packet retransmission frequently takes place due to a decoding error when the present invention is not applied. Only five packets in 100 frames are successfully received. In contrast thereto, when the present invention is applied, no packet retransmission occurs and 100 packets in 100 frames are successfully received.

As above, according to the first embodiment of the present invention, by controlling the gain based on the results obtained by observing the received signals in synchronization with frame, the number of signal retransmissions due to the decoding error is reduced and hence the throughput can be increased. Since the counter identifies the frame number being processed, the appropriate operation can be conducted even if the frame requires exceptional processing. In the above example, description has been given of operation for uplink signals of the UMB in which frames having mutually different lengths appear at an interval of 25 frames. However, by changing steps 504 to 506 and steps 510 and 511 of the first counter 406, it is possible to cope with other exceptional processing.

Figure 9:
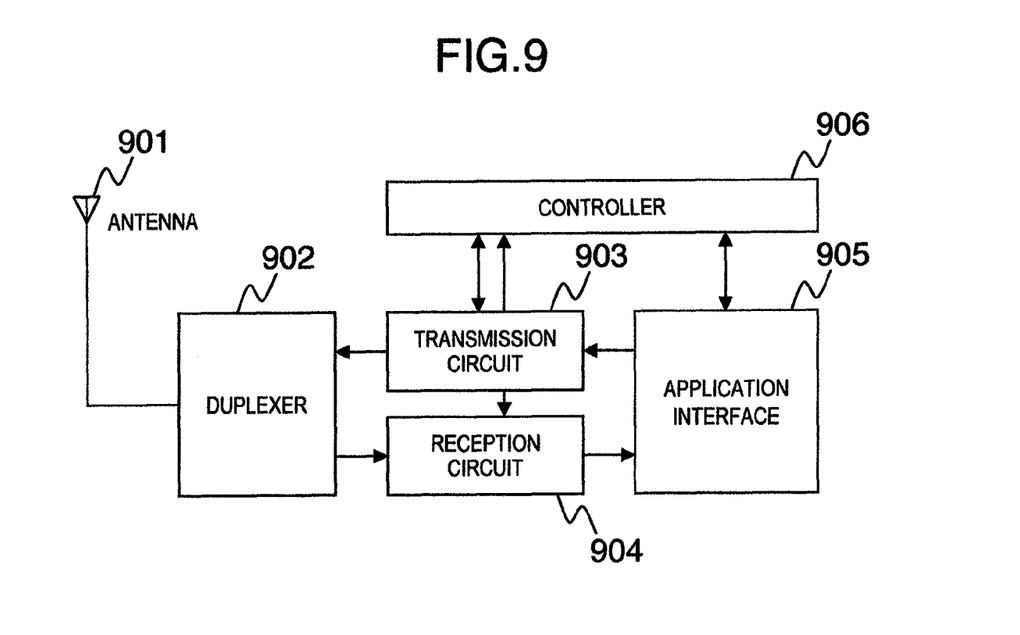
FIG. 9 is a block diagram showing an overall configuration of a mobile station.

In addition, the present embodiment is applicable not only to the reception circuit of the base station as described above, but also to the reception circuit of a mobile station for cellular wireless communication and to the reception circuit of an apparatus such as a digital broadcast receiver to receive OFDM signals. For example, the mobile station generally includes an antenna 901, a duplexer 902, a transmission circuit 903, a reception circuit 904, an application interface 905, and a controller 906 as shown in FIG. 9. The reception circuit 904 may be configured as shown in FIG. 4. In this situation, operation to be conducted in the circuits from the antenna 301 to the gain controller 410 is the same as in the reception circuit 304 of the base station which is configured as shown in FIG. 4.

Second Embodiment

Figure 6:
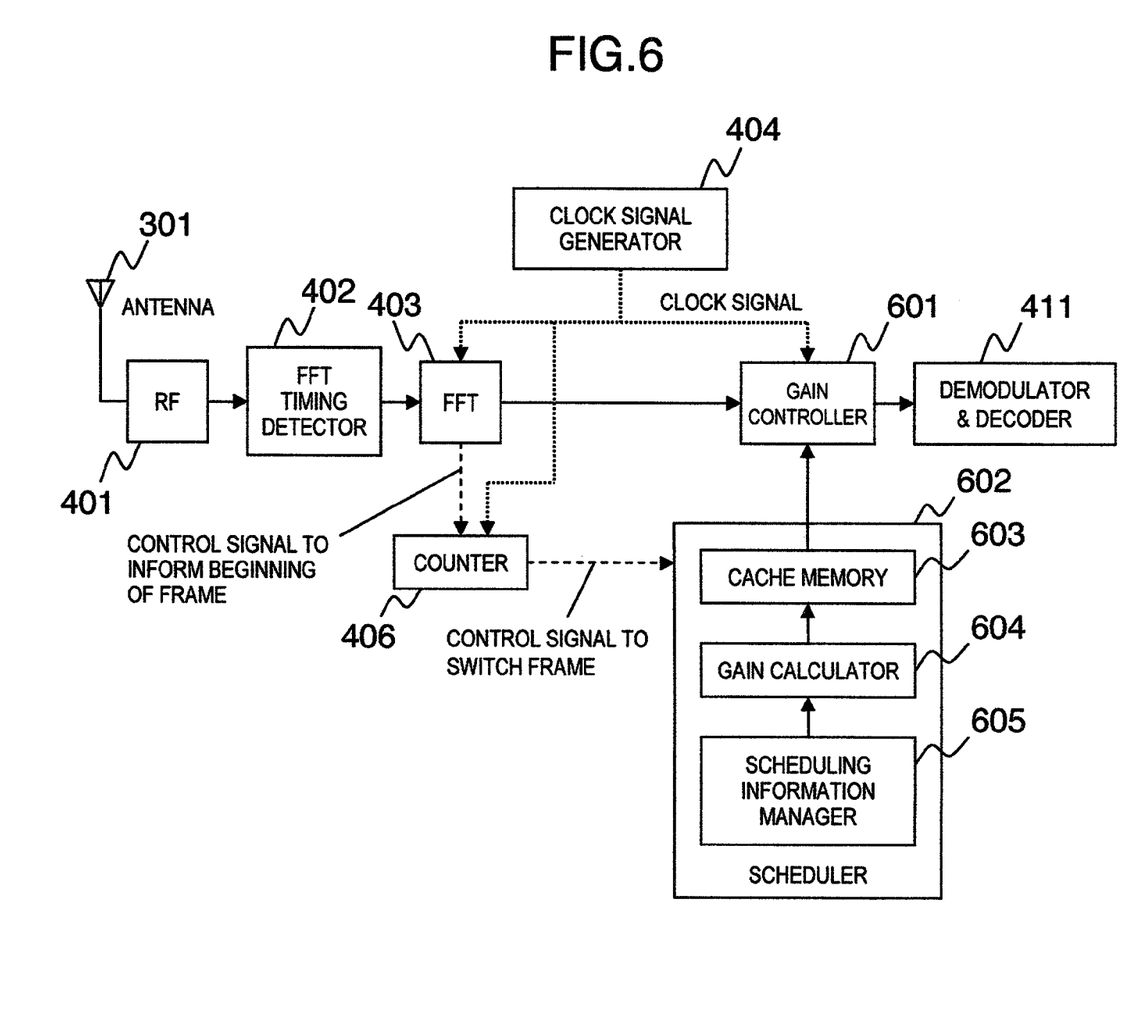
FIG. 6 is a block diagram showing a reception circuit of a base station in a second embodiment.

Referring to FIG. 6, description will be given of a second embodiment according to the present invention. When compared with the first embodiment, the second embodiment is equal thereto in the overall configuration as shown in FIG. 1 including the base stations 101 and 102, the network 103, and the mobile station 104, but differs therefrom in the configuration in the reception circuits of the base stations 101 and 102.

FIG. 6 is a block diagram showing a configuration of the reception circuit included in both the base stations 101 and 102. The circuit includes an antenna 301, an RF circuit 401, an FFT timing detector 402, an FFT calculator 403, a clock signal generator 404, a first counter 406, a gain controller 601, a scheduler 602, and a demodulator and decoder 411.

The scheduler 602 includes a cache memory 603, a gain calculator 604, and a scheduling information manager 605. The constituent components which are equal in configuration and operation to the associated constituent components of the first embodiment are assigned with the same reference numerals used in FIG. 4, and detailed description thereof will be avoided. Referring to FIG. 6, the following description will be given in detail of a flow of a signal received by the base station 101.

Processing from the signal reception by the antenna 301 to the FFT calculation by the FFT calculator 403 is similar to that of the first embodiment, and hence description thereof will be avoided.

The data sequence outputted from the FFT calculator 403 is inputted to the gain controller 601. When the FFT calculator 403 outputs the first signal of a frame, it transmits a control signal to inform beginning of frame to the first counter 406.

When the first counter 406 receives the control signal to inform beginning of frame, it transmits a control signal to switch frame to the scheduler 602.

When the scheduler 602 completely conducts the scheduling for uplink data transmission, it keeps the associated information in the scheduling information manager 605.

The gain calculator 604 refers to the scheduling information kept in the scheduling information manager 605. If an unused carrier is present, the calculator 604 calculates a gain in advance. The gain is, for example, a value obtained by dividing the number of subcarriers being used by the number of all subcarriers. As described above, the mean power of FFT output signals is in proportion to a reciprocal of the number of subcarriers being used. Hence, by using the gain value, the mean power of signals outputted from the gain controller 601 is consistently kept at a value equivalent to that obtained when all subcarriers are used.

When the scheduler 602 receives the control signal to switch frame from the first counter 406, it updates the information in the cache memory 603 to the gain for the frame associated therewith.

The gain controller 601 multiplies the data outputted from the FFT calculator 403 by the gain kept in the cache memory 603 to output the product of the multiplication. The information in the memory 603 is updated for each frame in response to the control signal to switch frame from the first counter 406. Hence, the gain controller 601 is capable of conducting gain control in synchronization with the frame.

The data sequence outputted from the gain controller 601 is inputted to the demodulator and decoder 411. Processing in the demodulator and decoder 411 is similar to that of the first embodiment, and hence description thereof will be avoided.

As described above, in the second embodiment of the present invention, each of the base stations 101 and 102 obtains information of unused subcarriers when the scheduling is completely conducted for the uplink data transmission. It is hence possible to beforehand calculate the gain before the associated uplink signal is received. Therefore, in addition to the advantage of the first embodiment, the processing delay required for the gain control can be reduced.

Third Embodiment

Figure 7:
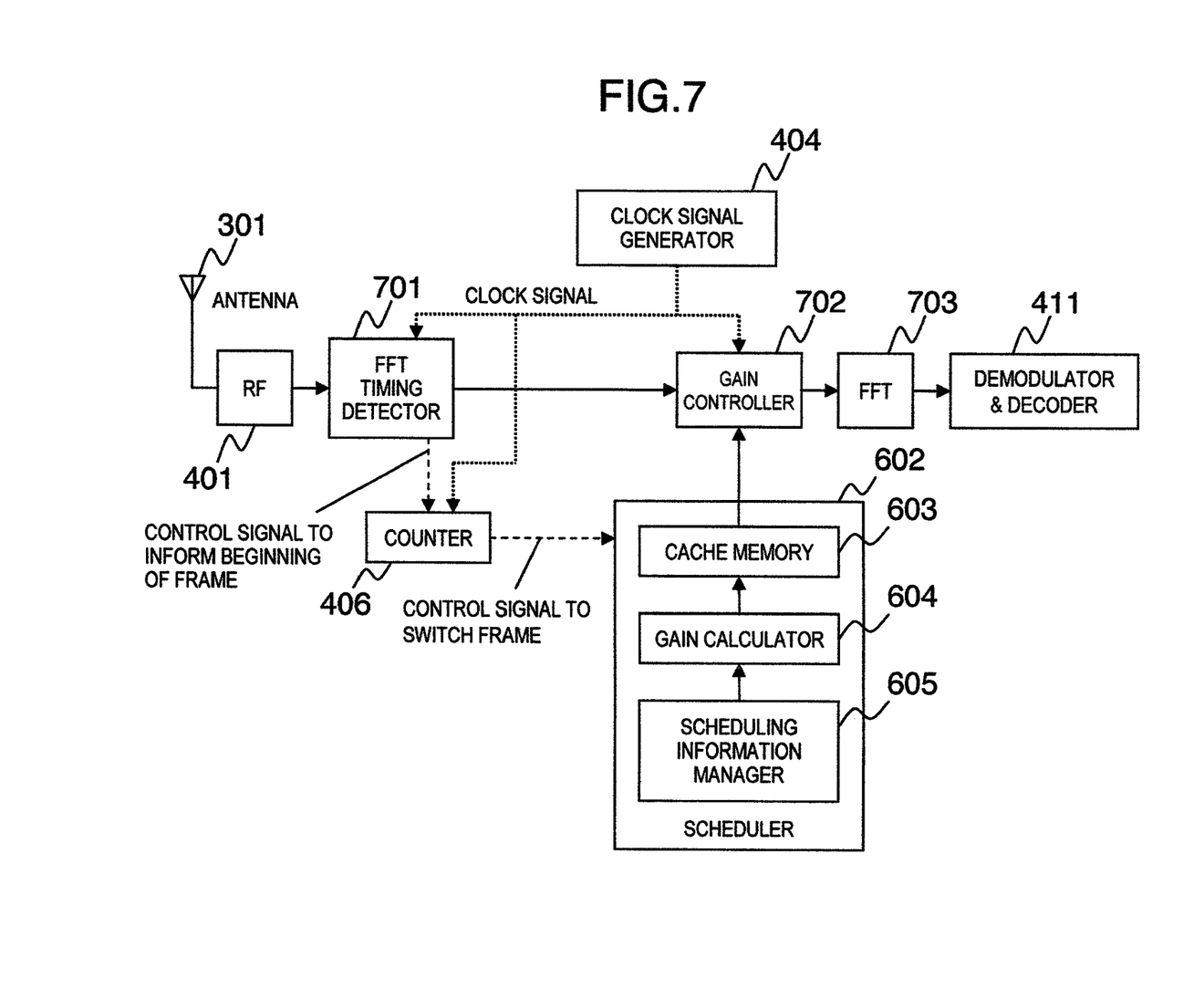
FIG. 7 is a block diagram showing a reception circuit of a base station in a third embodiment.

Referring to FIG. 7, description will be given of a third embodiment according to the present invention. When compared with the first and second embodiments, the third embodiment is equal thereto in the overall configuration shown in FIG. 1 including the base stations 101 and 102, the network 103, and the mobile station 104, but differs therefrom in the configuration of the reception circuits of the base stations 101 and 102.

FIG. 7 is a block diagram showing a configuration of the reception circuit included in both the base stations 101 and 102. The reception circuit includes an antenna 301, an RF circuit 401, an FFT timing detector 701, a clock signal generator 404, a first counter 406, a scheduler 602, a gain controller 702, an FFT calculator 703, and a demodulator and decoder 411. The constituent components which are equal in configuration and operation to the associated constituent components of the first or second embodiment are assigned with the same reference numerals used in FIG. 4 or 6, and detailed description thereof will be avoided.

Referring to FIG. 7, the following description will be given in detail of a flow of a signal received by the base station 101. Processing from the signal reception by the antenna 301 to the signal conversion into a baseband signal by the RF circuit 401 is similar to that of the first embodiment, and hence description thereof will be avoided.

The data sequence outputted from the RF circuit 401 is inputted to the FFT timing detector 701. The operation of the detector 701 to detect the first data of the data sequence for which the FFT calculation is conducted is similar to that of the FFT timing detector 402 of the first and second embodiments. However, the third embodiment differs from the first and second embodiments in an operation in which a control signal to inform beginning of frame is transmitted to the first counter 406 when the first data of the frame is outputted.

Since the operation of the first counter 406 and the scheduler 602 is similar to that of the second embodiment, description there of will be avoided.

The data sequence outputted from the FFT timing detector 701 is inputted to the gain controller 702. The controller 702 multiplies the inputted data by the gain kept in the cache memory 603.

The data sequence outputted from the gain controller 702 is inputted to the FFT calculator 703. The calculator 703 conducts an FFT calculation for the inputted data in the same way as the FFT calculator 403 of the first and second embodiments. However, since the gain control has been already conducted for the input data, the third embodiment differs from the first and second embodiments in that the control signal to inform beginning of frame is not transmitted when the first data of the frame is outputted.

The data sequence outputted from the FFT calculator 703 is inputted to the demodulator and decoder 411. The processing of the demodulator and decoder 411 is similar to that of the first embodiment. Hence, description thereof will be avoided.

As described above, according to the third embodiment of the present invention, the base stations 101 and 102 conduct the gain control in a stage before the FFT calculation. That is, if an unused subcarrier is present, the mean power is lowered in advance before the mean power is increased through the FFT. The signals, the mean power of which is substantially kept fixed by the AGC, are inputted to the gain controller. Hence, it is not required to enlarge the bit width in consideration of the increase in the power. As a result, in addition to the advantage of the second embodiment, the circuit size of the gain controller can be reduced in the third embodiment.

According to the present invention, it is possible in the OFDM-based cellular wireless communication that the number of signal retransmissions is lowered by preventing the decoding error, and the throughput can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. Communication equipment for receiving an OFDM signal to which subcarriers to be used are allocated for each frame including OFDM symbols, comprising: a reception circuit for receiving the OFDM signal, the reception circuit including:
a timing detector for detecting a boundary of a frame of a received signal;
a first counter for outputting a control signal to switch to a frame after the detected boundary;
a unit for calculating a gain in the frame after the boundary based on the control signal;
a gain controller for reading a signal sequence contained in the frame after the boundary based on the control signal and reflecting the calculated gain in the signal sequence; and
a decoder for decoding the signal sequence in which the gain is reflected.

2. Communication equipment according to claim 1, wherein:
the reception circuit comprises a Fourier transform unit between the timing detector and the gain controller; and
the Fourier transform unit conducts a Fourier transform for a received signal outputted from the timing detector and outputs a control signal to inform beginning of frame to the first counter at timing to output first data of a frame including a predetermined number of OFDM symbols after the Fourier transform.

3. Communication equipment according to claim 2, wherein the unit for calculating the gain comprises:
a peak detector for observing, based on the control signal to switch to a frame after the detected boundary outputted from the first counter, signal intensity of a frame outputted from the Fourier transform unit, detecting, as a peak signal, a signal having highest signal intensity in the frame, and outputting the signal intensity of the peak signal; and
a gain calculator for comparing the signal intensity of the peak signal with a predetermined reference value, and calculating a gain based on the signal intensity of the peak signal and the predetermined reference value if the signal intensity of the peak signal is more than the predetermined reference value.

4. Communication equipment according to claim 2, wherein the unit for calculating the gain comprises:
a scheduling information manager for keeping therein scheduling information of uplink data transmission;
a gain calculator for calculating a gain based on the scheduling information; and a cache memory for keeping the gain therein; and the unit for calculating the gain outputs, based on the control signal to switch to a frame after the detected boundary, the gain kept in the cache memory to the gain controller.

5. Communication equipment according to claim 4, wherein the cache memory is updated for each frame based on the control signal to switch to a frame after the detected boundary.

6. Communication equipment according to claim 5, wherein:

the reception circuit comprises a unit for calculating a gain in the frame after the boundary based on the control signal to switch to a frame after the detected boundary;

the unit for calculating the gain comprises a scheduling information manager for keeping therein scheduling information of uplink data transmission, a gain calculator for calculating a gain based on the scheduling information, and a cache memory for keeping the gain therein; and the unit for calculating the gain outputs, based on the control signal to switch to a frame after the detected boundary, the gain kept in the cache memory to the gain controller.

7. Communication equipment according to claim 1, wherein the first counter outputs the control signal to switch to a frame after the detected boundary based on the control signal to inform beginning of frame.

8. Communication equipment according to claim 1, wherein:

the reception circuit comprises a Fourier transform unit between the gain controller and the decoder; and the Fourier transform unit conducts a Fourier transform for a signal sequence in which the gain outputted from the gain controller is reflected.

9. Communication equipment according to claim 1, wherein the unit for calculating the gain refers to a signal in a frequency domain obtained by conducting a Fourier transform for a received signal, detects an excessive signal having signal intensity exceeding a reference value, and calculates a gain variable according to an excessive quantity of the signal intensity of the excessive signal relative to the reference value.

10. Communication equipment according to claim 1, wherein a number assigned to the frame is identified, the gain is calculated according to the number, and a period of time to reflect the gain in the received signal varies according to the number.

11. Communication equipment according to claim 1, wherein the gain controller reflects in a received signal the gain for the frame associated therewith outputted from the unit for calculating the gain.

12. Communication equipment according to claim 1, wherein the unit for calculating the gain refers to information regarding allocation of subcarriers to a received signal, detects an excessive signal having signal intensity exceeding a reference value, and calculates a gain variable according to an excessive quantity of the signal intensity of the excessive signal relative to the reference value.

13. Communication equipment according to claim 1, wherein the first counter identifies a number assigned to the frame, and timing to detect the boundary is variable according to the number.

14. Communication equipment according to claim 1, wherein the OFDM signal is transmitted through wireless communication with a transmitter.

15. An OFDM-based wireless communication system in which a transmitter communicate an OFDM signal with a receiver, wherein:

subcarriers to be used are allocated to the OFDM signal, for each frame including a predetermined number of OFDM symbols;

the receiver comprises a reception circuit comprising:

a timing detector for detecting a boundary of a frame of a received signal;

a first counter for outputting a control signal to switch to a frame after the detected boundary;

a unit for calculating a gain in the frame after the boundary based on the control signal to switch to a frame after the detected boundary;

a gain controller for reading a signal sequence contained in the frame after the boundary based on the control signal to switch to a frame after the detected boundary and reflecting the calculated gain in the signal sequence; and a decoder for decoding the signal sequence in which the gain is reflected.

16. A method of receiving an OFDM signal, wherein subcarriers to be used are allocated to the OFDM signal, for each frame including a predetermined number of OFDM symbols, the method comprising the steps of:

detecting as an excessive signal for each frame due to unused subcarriers, the excessive signal having signal intensity exceeding a reference value after a Fourier transform;

calculating, at detection of the excessive signal, a gain variable according to an excessive quantity relative to the reference value; and using for a received signal, the gain for the frame associated therewith.

17. A method of receiving an OFDM signal according to claim 16, wherein the OFDM signal is communicated through wireless communication.

* * * * *